(12) United States Patent
Ito

(10) Patent No.: US 8,602,830 B2
(45) Date of Patent: Dec. 10, 2013

(54) TERMINAL COMPONENT AND PORTABLE ELECTRONIC DEVICE

(75) Inventor: Yugo Ito, Yokohama (JP)

(73) Assignee: Kyocera Corporation, Kyoto (JP)

( * ) Notice: Subject to any disclaimer, the term of this patent is extended or adjusted under 35 U.S.C. 154(b) by 453 days.

(21) Appl. No.: 12/994,683

(22) PCT Filed: May 29, 2009

(86) PCT No.: PCT/JP2009/059911
§ 371 (c)(1),
(2), (4) Date: Nov. 24, 2010

(87) PCT Pub. No.: WO2009/145324
PCT Pub. Date: Dec. 3, 2009

(65) Prior Publication Data
US 2011/0068743 A1     Mar. 24, 2011

(30) Foreign Application Priority Data
May 29, 2008     (JP) ................. 2008-141044

(51) Int. Cl.
*H01R 4/02* (2006.01)
(52) U.S. Cl.
USPC ........................................ 439/876
(58) Field of Classification Search
USPC ................ 361/804, 742, 758, 770; 439/876
See application file for complete search history.

(56) References Cited

U.S. PATENT DOCUMENTS

| | | | | |
|---|---|---|---|---|
| 4,813,129 A | * | 3/1989 | Karnezos | 29/832 |
| 4,976,626 A | * | 12/1990 | Dibble et al. | 439/67 |
| 5,073,118 A | * | 12/1991 | Grabbe et al. | 439/71 |
| 5,180,311 A | * | 1/1993 | Schreiber et al. | 439/74 |
| 5,425,647 A | * | 6/1995 | Mencik et al. | 439/83 |
| 5,466,161 A | * | 11/1995 | Yumibe et al. | 439/66 |
| 5,876,223 A | * | 3/1999 | Kaneshige et al. | 439/108 |
| 5,909,011 A | * | 6/1999 | Chartrand et al. | 174/261 |
| 5,956,235 A | * | 9/1999 | Kresge et al. | 361/774 |
| 5,969,952 A | * | 10/1999 | Hayashi et al. | 361/774 |
| 5,984,692 A | * | 11/1999 | Kumagai et al. | 439/66 |
| 6,000,969 A | * | 12/1999 | Reichardt et al. | 439/630 |

(Continued)

FOREIGN PATENT DOCUMENTS

| | | |
|---|---|---|
| JP | 2-014677 | 1/1990 |
| JP | 4-072562 | 6/1992 |

(Continued)

OTHER PUBLICATIONS

Japanese Office Action "Notification of Reason for Refusal" dated Feb. 5, 2013, which corresponds to Japanese Patent Application No. 2008-141044 and is related to U.S. Appl. No. 12/994,683 with translation.

*Primary Examiner* — Neil Abrams
(74) *Attorney, Agent, or Firm* — Studebaker & Brackett PC

(57) ABSTRACT

A terminal component that is inexpensive and has a high degree of freedom of mounting and a portable electronic device using the terminal component are provided. The terminal component 15 includes a metal plate 41 having a contact surface 15a to contact a power supply terminal 105 of a charging stand 101, wherein at least two portions of an end part of the metal plate 41 are bent, and a resin member 43 that is held by the bent portions. A part to be mounted 41c on a sub-substrate 31 is formed at the bent portions of the metal plate 41.

12 Claims, 9 Drawing Sheets

(56) References Cited

U.S. PATENT DOCUMENTS

| | | | |
|---|---|---|---|
| 6,007,349 A * | 12/1999 | Distefano et al. | 439/71 |
| 6,475,043 B2 * | 11/2002 | Pereira et al. | 439/876 |
| 6,674,018 B2 * | 1/2004 | Yumi | 174/267 |
| 6,940,013 B2 * | 9/2005 | Vinciarelli et al. | 174/541 |
| 6,986,669 B2 * | 1/2006 | Kawai | 439/66 |
| 7,938,647 B2 * | 5/2011 | Zheng et al. | 439/66 |
| 8,000,738 B2 * | 8/2011 | Kang et al. | 455/550.1 |

FOREIGN PATENT DOCUMENTS

| | | |
|---|---|---|
| JP | 9-045396 | 2/1997 |
| JP | 9-149108 | 6/1997 |
| JP | 11-186688 | 7/1999 |
| JP | 2008-011213 A | 1/2008 |

* cited by examiner

TERMINAL COMPONENT AND PORTABLE ELECTRONIC DEVICE

TECHNICAL FIELD

The present invention relates to a terminal component such as charging terminal and a portable electronic device having the terminal component.

BACKGROUND ART

A variety of terminal components such as charging terminal for connecting an electronic device to another device are well known. For example, Patent Document 1 discloses a charging terminal of a spring type which is attached to a casing of an electronic device to be exposed to the outside of the casing and allows a contact point to contact to a circuit substrate in the casing by biasing force of a spring. Patent Document 2 discloses a charging terminal that is fixed to a circuit substrate by a screw. A charging terminal is also known which is configured by a metal plate that is bent to have a section of an approximate U shape and resin that surrounds the metal plate so that tip ends (two upper ends) of U shape and a bottom surface are exposed. In this charging terminal, the tip ends of U shape are inserted and soldered in mounting holes formed at a circuit substrate. In other words, the charging terminal is fixed to the circuit substrate by the dip soldering.

PRIOR ART DOCUMENTS

Patent Documents

Patent Document 1: JP-A-2008-11213
Patent Document 2: JP-A-9-149108

SUMMARY OF THE INVENTION

Problems to be Solved by the Invention

The above terminal components have advantages and disadvantages, respectively. For example, the terminal component of a spring type does not require the soldering. However, a space corresponding to a stroke of the spring is required in the casing and a shape of the casing is complicated so as to attach the terminal component. The terminal component in which the metal plate is surrounded by the resin can be soldered to the circuit substrate. However, the soldering is limited to the dip soldering and it is difficult to enlarge an exposed surface of the metal plate regarding a size of the resin. These terminal components are appropriately selected and attached depending on various situations in a portable electronic device.

Therefore, it is preferable to provide a terminal component that can realize facility of attachment, reduction of size and reduction of costs, which are different advantages from the above terminal components, and to diversify technologies in a terminal component and a portable electronic device having the terminal component.

Means for Solving the Problems

A terminal component according to a first aspect of the present invention includes a metal plate including a contact surface to contact a contact point of another device, wherein at least two portions of an end part of the metal plate are bent; and a resin member that is held by the bent portions, wherein a part to be mounted on a circuit substrate is formed at the bent portions of the metal plate.

It is preferable that the resin member includes a first surface and a second surface that is a backside of the first surface, the metal plate is arranged so that a backside of the contact surface is contacted to the first surface, and the end part of the metal plate is bent to cover at least a part of the second surface while extending around an outer side of the resin member via a side of the first surface.

It is preferable that the resin member includes a first surface and a second surface that is a backside of the first surface, the second surface is formed with a groove portion, the metal plate is arranged so that a backside of the contact surface is contacted to the first surface, and the end part of the metal plate is bent so that that the end part covers at least a part of the second surface while extending around an outer side of the resin member via a side of the first surface and a tip end of the end part is inserted into the groove portion from the second surface.

It is preferable that the resin member includes a first surface and a second surface that is a backside of the first surface, the metal plate is arranged so that a backside of the contact surface is contacted to the first surface, and the end part of the metal plate is bent so that the end part covers at least a part of the second surface while extending an outer side of the resin member via a side of the first surface and a part of the end part protrudes from the second surface.

It is preferable that the metal plate is bent at two sides that are opposed to each other with the contact surface being interposed therebetween to hold the resin member.

It is preferable that the resin member has a hole that is formed on a surface which intersects a bending line of the end part of the metal plate, and the metal plate further includes an extension part at a part other than the two portions of the end part, the extension part being bent so that a tip end thereof is extended toward a direction extending along the bending line and inserted into the hole.

A portable electronic device according to a second aspect of the present invention includes a casing formed with an opening, a circuit substrate that is provided in the casing, and a terminal component that is mounted on the circuit substrate and is exposed through the opening, wherein the terminal component includes a metal plate including a contact surface that is at least partially exposed through the opening to contact a contact point of another device, wherein at least two portions of an end part of the metal plate are bent, and a resin member that is held by the bent portions, and wherein the terminal component is soldered to the circuit substrate at the bent portions of the metal plate.

It is preferable that a secondary battery that supplies power to the circuit substrate, the circuit substrate includes a charging circuit that is connected to the secondary battery so that power can be supplied to the secondary battery, and the terminal component is connected to the charging circuit.

It is preferable that the resin member includes a first surface and a second surface that is formed on a backside of the first surface, the metal plate is arranged so that a backside of the contact surface is contacted to the first surface, and the end part of the metal plate is bent to cover at least a part of the second surface while extending around an outer side of the resin member via a side of the first surface, and a part covering the second surface is soldered to the circuit substrate.

It is preferable that the resin member includes a first surface and a second surface that is formed on a backside of the first surface, the second surface is formed with a groove portion, the metal plate is arranged so that a backside of the contact surface is contacted to the first surface, and the end part of the metal plate is bent so that the end part covers at least a part of the second surface while extending around an outer side of the resin member via a side of the first surface and a tip end of the end part is inserted into the groove portion from the second surface.

It is preferable that the resin member includes a first surface and a second surface that is formed on a backside of the first surface, the metal plate is arranged so that a backside of the contact surface is contacted to the first surface, and the end part of the metal plate is bent so that the end part covers at least a part of the second surface while extending an outer side of the resin member via a side of the first surface and a part of the end part protrudes from the second surface and is inserted and soldered in a mounting hole provided in the circuit substrate.

A terminal component according to a third aspect of the present invention includes a metal plate including a contact surface to contact a contact point of another device, and a resin member that is held by the metal plate, wherein a part to be mounted on a circuit substrate is formed at a position of holding the resin member in the metal plate.

Effects of the Invention

According to the present invention, it is possible to diversify technologies in a terminal component and a portable electronic device having the terminal component.

DETAILED DESCRIPTION OF EMBODIMENTS

First Embodiment

Figure 1:
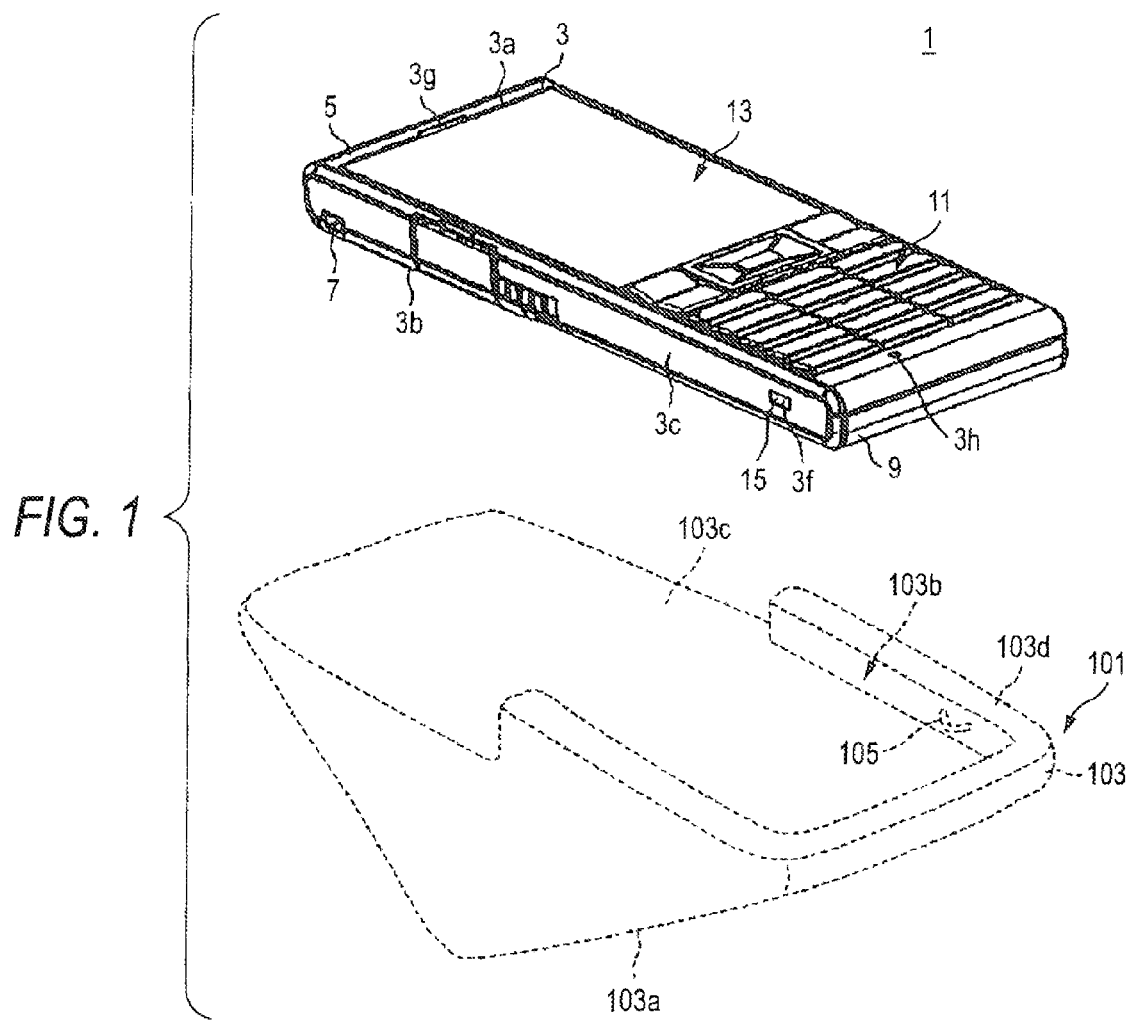
FIG. 1 is a perspective view showing an outer appearance of a portable telephone according to a first embodiment of the present invention.

FIG. 1 is a perspective view of a portable telephone 1 according to a first embodiment of the present invention. In FIG. 1, a charging stand 101 for charging the portable telephone 1 is also schematically shown.

The portable telephone 1 is configured by a portable telephone of a so-called straight type and has one casing 3. The casing 3 has a thin rectangular parallelepiped shape, for example. In the followings, a surface of the casing 1 in the upper side of FIG. 1, is referred to as a front part 3*a*, a backside thereof is referred to as a backside part 3*b*, and left-lower surface and right-upper surface intersecting the front part 3*a* and the backside part 3*b* are referred to as side parts 3*c* (the side part 3*c* in the right-upper side of FIG. 1 is not shown as being hidden by the front part 3*a*). In addition, the upper side, the lower side, the left-lower side and right-upper side, the left-upper side and the right-lower side of FIG. 1 can be referred to as front side, backside, side face (side direction), upper side and lower side.

The casing 3 is provided with various electronic components and the like. For example, the casing 3 is provided with a first speaker 83 (refer to FIG. 7) for calling, which outputs sound through a first sound output hole 3*g* opened at an upper side of the front part 3*a*, a microphone 87 (refer to FIG. 7) for calling, to which sound is input through a sound receiving hole 3*h* opened at a lower side of the front part 3*a*, an operation unit 11 that receives an operation of a user from the front part 3*a*, a display unit 13 that displays an image at the front part 3*a* and a terminal component 15 that serves as a charging terminal for charging a battery 23 (refer to FIG. 2) of the portable telephone 1.

The terminal component 15 is provided in the casing 3 so that a part thereof is exposed through an opening 3*f* opened at a lower side of the side part 3*c*, for example. The two terminal components 15 are provided, correspondingly to the two side parts 3*c* (an opening 3*f* and a terminal component 15 in the right-upper side of the drawing sheet are hidden by the casing 3 and are thus not shown).

The charging stand 101 has a charging casing 103 and power supply terminals 105 that protrude from the charging casing 103. The charging casing 103 is placed on a desk and the like while its loading surface 103*a* is downward and approximately horizontal. A holding part 103*b* that holds the portable telephone 1 has an inclined surface 103*c* that is inclined with respect to the loading surface (horizontal surface) 103*a* and a wall part 103*d* that stands while surrounding the inclined surface 103*c* on at least a lower side (right side) of the inclined surface 103*c*.

The power supply terminals 105 are protruded from an inner surface of the wall part 103*d* by elastic force of a spring (not shown) or inner part of the casing of the power supply terminals 105. The two power supply terminals 105 are provided at left and right sides of the charging stand 101 (a power supply terminal 105 in the front side of the drawing sheet is hidden by the wall part 103*d* and are thus not shown).

The portable telephone 1 is placed on the holding part 103*b* of the charging casing 103 with the backside part 3*b* facing the inclined surface 103*c*. At this time, a lower part of the portable telephone 1 is fitted into a recess part formed by the wall part 103*d*. The side parts 3*c* of the portable telephone 1 are opposed to an inner surface of the wall part 103*d* and the power supply terminals 105 are contacted to the terminal components 15 by the elastic force.

Figure 2:
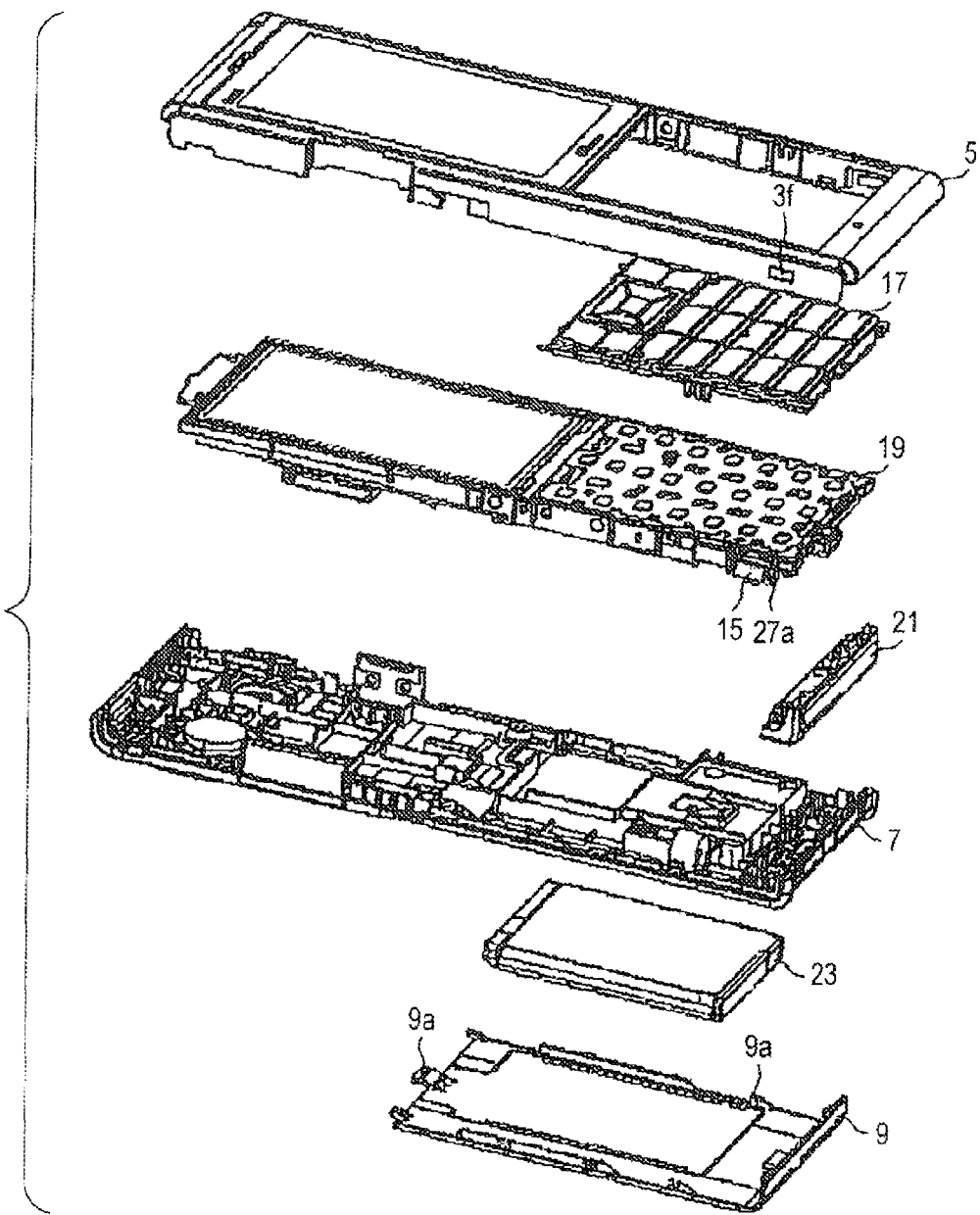
FIG. 2 is an exploded perspective view of the portable telephone shown in FIG. 1.

FIG. 2 is an exploded perspective view of the portable telephone 1.

The portable telephone 1 has, in order from the front side (upper side of FIG. 2), a front case 5 that configures the front part 3*a* of the casing, an operation member 17 that configures the operation unit 11, a shield module 19 that is modularized by fixing various electronic components each other, an antenna 21, a rear case 7 that configures the backside part 3*b* of the casing 3, a battery 23 and a lid 9 that configures the backside part 3*b* of the casing 3 together with the rear case 7.

The front case 5, the rear case 7 and the lid 9 are respectively made of resin, for example. The front case 5 and the rear case 7 are fixed to each other by screws (not shown). Thereby, the operation member 17, the shield module 19 and the antenna 21 are sandwiched between the front case 5 and the rear case 7. It is noted that the openings 3f are formed at the front case 5. The lid 9 is provided for inserting and detaching the battery 23 into and from the casing 3. The lid 9 is fixed to the rear case 7 by a plurality of connection portions 9a. Thereby, the battery 23, which is mounted at a recess portion formed at a backside of the rear case 7, is prevented from being detached.

Figure 3:
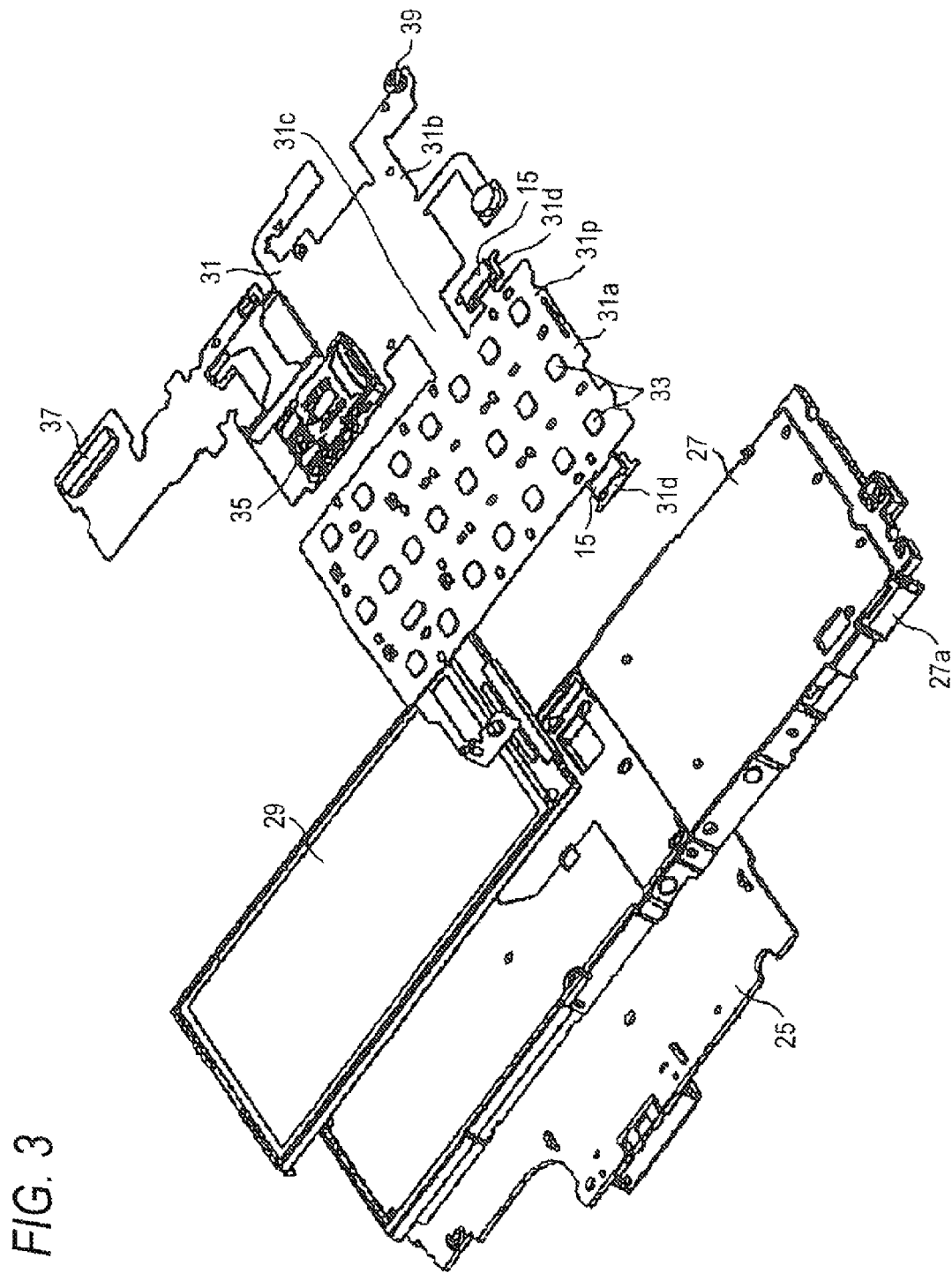
FIG. 3 is an exploded perspective view of a shield module of FIG. 2.

FIG. 3 is an exploded perspective view of the shield module 19.

The shield module 19 has, in order from the backside (lower side of FIG. 3), a main substrate 25, a frame member 27, a display apparatus 29 that configures the display unit 13 and a sub-substrate 31. The main substrate 25 and the sub-substrate 31 may be integrated into one circuit substrate.

The main substrate 25 is configured by a printed substrate of a rigid type, which is based on rigid resin, for example. The frame member 27 is configured by a conductive member of metal and the like or a member having a conductive layer of metal and like formed on a surface of a non-conductive base of resin and the like. The display apparatus 29 is configured by a liquid crystal display apparatus or organic electroluminescence apparatus, for example.

The sub-substrate 31 is configured by a FPC of one-sided mounting type in which an electronic component is mounted on a mounting surface 31p of the upper side of FIG. 3, for example. The sub-substrate 31 is bent at a connection part 31c and thus wrapped around the frame member 27. In other words, the sub-substrate 31 has a front substrate part 31a that is arranged at a front side of the frame member 27 and a backside substrate part 31b that is arranged at a backside of the frame member 27.

The front substrate part 31a is provided with a plurality of switches 33, which are operated through the operation member 17 and configure the operation unit 11. The backside substrate part 31b is provided with a slot component 35 for mounting an IC card (not shown), a connector 37 that connects the sub-substrate 31 and the main substrate 25 and a connection terminal 39 that is connected to the antenna 21. The front substrate part 31a and the backside substrate part 31b are fixed to the frame member 27 by an adhesive member such as adhesive agent or both-sided tape, for example.

The sub-substrate 31 further has substrate parts for terminal 31d, which extend from two side edges of the front substrate part 31a. The terminal components 15 are respectively mounted on the substrate parts for terminal 31d. The terminal components 15 are mounted in such a way that surfaces thereof exposed through the openings 3f face an opposite side to the mounting surface 31p of the sub-substrate 31. The front substrate part 31a is bent at an approximate right angle, so that the substrate parts for terminal 31d are arranged at terminal arranging parts 27a, which configure parts of sides of the frame member 27 (refer to FIG. 2). The substrate parts for terminal 31d and the terminal arranging parts 27a are fixed each other by an adhesive member such as adhesive agent or both-sided tape, for example.

Figure 4:
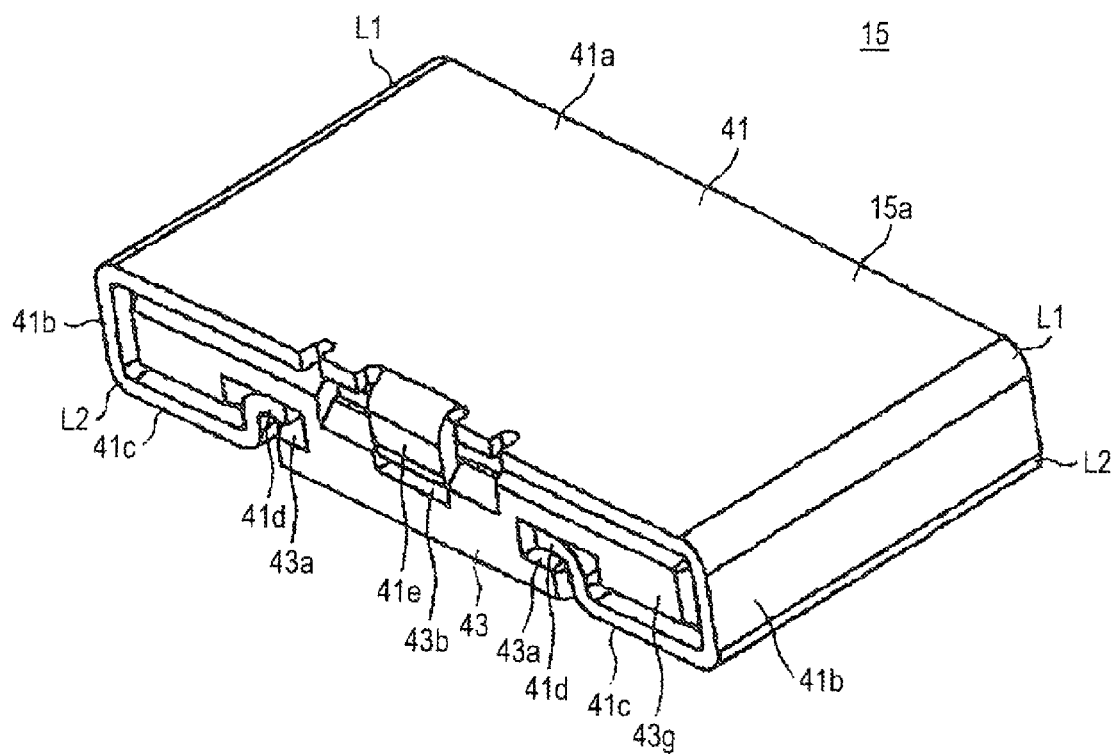
FIG. 4 is a perspective view of a terminal component of the portable telephone of FIG. 1.
Figure 5:
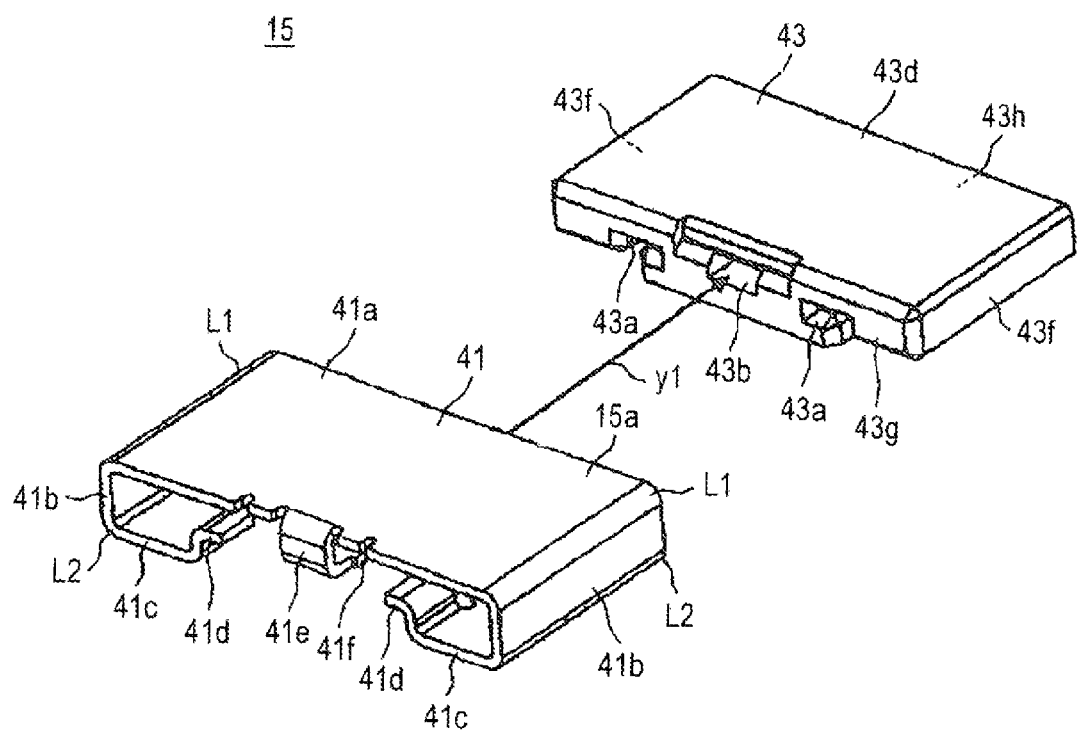
FIG. 5 is an exploded perspective view of the terminal component of FIG. 4.
Figure 6:
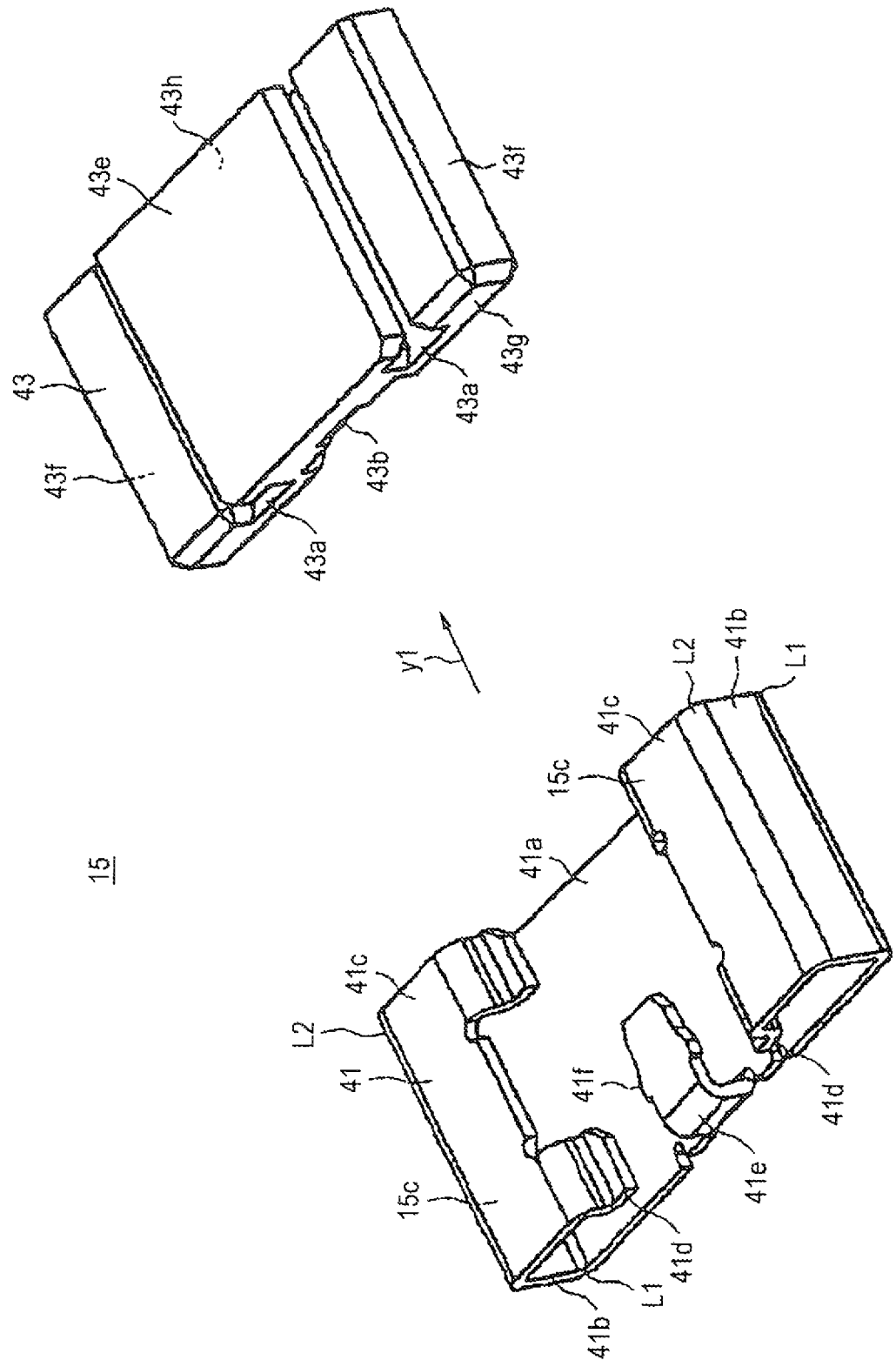
FIG. 6 is an exploded perspective view of the terminal component of FIG. 4, which is seen from a direction different from FIG. 5.

FIG. 4 is a perspective view of the terminal component 15. FIG. 5 is an exploded perspective view of the terminal component 15. FIG. 6 is an exploded perspective view of the terminal component 15, which is seen from a direction different from FIG. 5. The part at the upper side in FIGS. 4 and 5 or at the lower side in FIG. 6 is exposed to the outside of the casing 3 through the openings 3f. A direction (length direction of the terminal component 15) from the left-upper side to the right-lower side in each of drawings is a length direction of the portable telephone 1.

The terminal component 15 has an approximately thin rectangular parallelepiped shape and a contact surface 15a (refer to FIGS. 4 and 5) at one side of a thickness direction, which is exposed through the opening 3f, and surfaces to be mounted 15c (refer to FIG. 6) at the other side, which is connected to the substrate part for terminal 31d. The terminal component 15 is arranged at the portable telephone 1 so that a length direction of the terminal component 15 is matched to a length direction of the portable telephone 1 (refer to FIG. 2). The surfaces to be mounted 15c are arranged so that the outer surface (lower surface of FIG. 4) opposes the substrate part for terminal 31d and are soldered to the substrate part for terminal 31d by reflow and the like.

The terminal component 15 has a metal plate 41 having the contact surface 15a and the surfaces to be mounted 15c and a resin member 43 that is held to the metal plate 41. The resin member 43 contributes to light-weighting of the terminal component 15 and improvement on strength of the metal plate 41. As indicated with an arrow y1 in FIGS. 5 and 6, the metal plate 41 and the resin member 43 are slid toward each other in the width direction of the terminal component 15, so that the resin member 43 is fitted in the metal plate 41. In the followings, the metal plate 41 and the resin member 43 will be described in more detail.

The metal plate 41 is configured by metal sheet of one piece, for example, and formed into the shown shape by press processing and has a surface that is gold-plated. The metal plate 41 has a contact surface part 41a, side parts 41b extending from the contact surface part 41a, parts to be mounted 41c extending from the side parts 41b, insertion parts 41d extending from the parts to be mounted 41c and an extension part 41e that extends from the contact surface part 41a in a direction different from the side parts 41b.

The contact surface part 41a configures the contact surface 15a by one surface thereof. The contact surface part 41a (contact surface 15a) has a quadrangular shape, more specifically rectangular shape.

The side parts 41b extend from two opposite sides of the contact surface part 41a (in this embodiment, two opposite sides in a length direction of the contact surface part 41a. First bending lines L1) toward the inside of the casing 3 (lower side of FIGS. 4 and 5, upper side of FIG. 6) and are orthogonal to the contact surface part 41a.

The parts to be mounted 41c configure the surfaces to be mounted 15c. The parts to be mounted 41c extend from edges (second bending lines L2) of the side parts 41b, which are opposite to the contact surface part 41a, toward a center side of the contact surface part 41a in parallel with the contact surface part 41a and are orthogonal to the side parts 41b.

The insertion parts 41d extend from edges of the parts to be mounted 41c, which are opposite to the side parts 41b, toward the contact surface part 41a in parallel with the side parts 41b and then toward the center side of the contact surface part 41a in parallel with the contact surface part 41a. That is, the insertion parts have an L-shaped section, respectively.

The extension part 41e extends from a first side of the contact surface part 41a, which is orthogonal to the sides from which the side parts 41b extend, toward the surfaces to be mounted 15c and then toward the center side of the contact surface part 41a in parallel with the contact surface part 41a. A tip end portion (which is parallel with the contact surface part 41a) of the extension part 41e is provided with a widened portion 41f (refer to FIG. 6) that is gradually widened from a tip end side thereof to a bottom end side.

The resin member 43 is formed by an injection molding of filling melted resin in a mold, for example. The mold is configured so that the mold is opened and closed in the sliding direction of the metal plate 41 and the resin member 43.

The resin member 43 has an approximately rectangular parallelepiped shape and a first surface 43*d* (FIG. 5) that faces the outside of the casing 3, a second surface 43*e* (FIG. 6) that is a backside of the first surface, two side surfaces 43*f* (FIGS. 5 and 6) that are opposed to each other at sides of the first surface 43*d* and the second surface 43*e* and in a length direction of the resin member 43, a third surface 43*g* and a fourth surface 43*h* (FIGS. 5 and 6), which is a backside of the third surface, that are opposed to each other at sides of the first surface 43*d* and the second surface 43*e* and in a width direction of the resin member 43.

The second surface 43*e* is formed with two groove portions 43*a* that extend from an end to an end of the resin member 43 in the width direction of the terminal component 15. The groove portion 43*a* has a sectional shape that is the same as that of the insertion part 41*d*, i.e., an approximate L shape. The second surface 43*e* is formed such that a portion at a side of side face 43*f* from the groove portion 43*a* is lower than a portion at a center side from the groove portion 43*a* by about a thickness of the metal plate 41.

The third surface 43*g* is formed with a hole 43*b*. The hole 43*b* extends to the fourth surface 43*h*, for example, so that it is also opened at the fourth surface 43*h*. However, the hole 43*b* may be a recess portion that does not extend to the fourth surface 43*h*.

As described above, the metal plate 41 and the resin member 43 are slid and assembled to each other in the width direction of the terminal component 15. The resin member 43 is held with being surrounded by the contact surface part 41*a*, the side parts 41*b* and the parts to be mounted 41*c*. More specifically, for example, the first surface 43*d* of the resin member 43 is contacted to an inner surface (backside of the contact surface 15*a*) of the contact surface part 41*a*, the two side surfaces 43*f* are contacted to inner surfaces of the side parts 41*b* of the metal plate 41 and the second surface 43*e* is contacted to inner surfaces of the parts to be mounted 41*c*.

The insertion parts 41*d* are inserted and fitted in the groove portions 43*a*. Thereby, the resin member 43 and the metal plate 41 are fixed more firmly and the metal plate 41 is suppressed from being rolled up from the edges of the insertion parts 41*d*.

The extension part 41*e* is inserted into the hole 43*b*. The widened portion 41*f* is pressed in the opening 43*b* or engaged to an engagement part (not shown) formed in the hole 43*b*, so that it suppresses the extension part 41*e* from being detached from the opening 43*b*.

The assembled terminal component 15 is fixed to the portable telephone 1 by soldering the surfaces to be mounted 15*c* to the sub-substrate 31, as described above. At this time, the central part of the second surface 43*e* of the resin member 43 is contacted to the sub-substrate 31. The two parts to be mounted 41*c* are contacted to cream soldering applied on two land pads of the substrate parts for terminal 31*d* of the sub-substrate 31.

Figure 7:
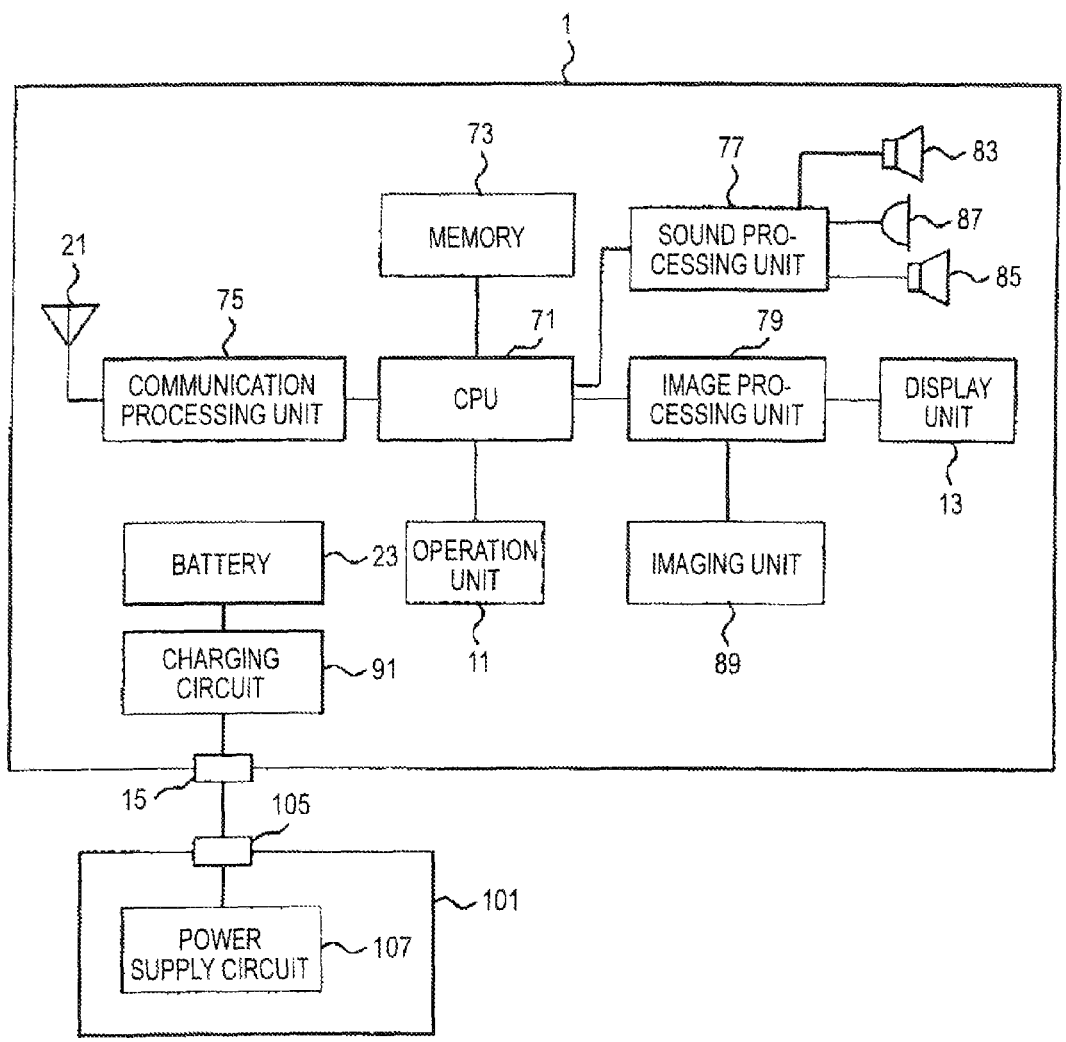
FIG. 7 is a block diagram showing a configuration of a signal processing system of the portable telephone shown in FIG. 1.

FIG. 7 is a block diagram showing a configuration of a signal processing system of the portable telephone 1.

The portable telephone 1 has a CPU 71, a memory 73, a communication processing unit 75, a sound processing unit 77 and an image processing unit 79. Each of the units is configured by an IC that is provided on a circuit substrate (not shown) provided in the casing 3.

The CPU 71 and the memory 73 perform a predetermined calculation based on signals from various means such as operation unit 11 and serve as a control unit that controls various means such as image processing unit 79.

The communication processing unit 75 includes a high frequency circuit. The communication processing unit 75 modulates various data such as sound data and image data, which are processed in the CPU 71, and transmits the data through the antenna 21 so as to perform communication with another portable telephone or server through a communication system (telephone network or internet) by wireless communication using radio waves. In addition, the communication processing unit 75 demodulates a signal received through the antenna 21 and then outputs it to the CPU 71.

The sound processing unit 77 converts sound data from the CPU 71 into an electric signal and then outputs the signal to the first speaker 83 for calling or a second speaker 85 that outputs an alarm sound and the like. The first speaker 83 and the second speaker 85 convert and output the electric signal from the sound processing unit 77 into sound. In the meantime, the microphone 87 converts the input sound into an electric signal and outputs the signal to the sound processing unit 77. The sound processing unit 77 converts the electric signal from the microphone 87 into sound data and output the sound data to the CPU 71.

The image processing unit 79 converts the image data from the CPU 71 into an image signal and then outputs the image signal to the display unit such as display unit 13. In addition, the image processing unit converts an image signal (image data), which is output from an imaging unit 89, into image data of a predetermined format and then outputs the image data to the CPU 71.

The respective units are operated by power supplied from the battery 23. The battery 23 is supplied with power from a power supply circuit 107 of the charging stand 101 through the power supply terminals 105, the terminal components 15 and a charging circuit 91 and accumulates the supplied power. The power supply circuit 107 converts alternating current from a commercial power source into direct current voltage of proper voltage and outputs it to the power supply terminal 105, for example. The charging circuit 91 supplies the power, which is supplied from the power supply circuit 107 through the power supply terminals 105 and the terminal components 15, as it is, to the battery 23 or converts the power into direct current power of proper voltage and outputs it to the battery. It is noted that the functions of the power supply circuit 107 and the charging circuit 91 may be appropriately divided. The charging circuit 91 is provided to the main substrate 24 and/or the sub-substrate 31, for example.

According to the above embodiment, the terminal component 15 has the metal plate 41 having the contact surface 15*a* that is contacted to the power supply terminal 105 of the charging stand 101, in which at least two portions (in the embodiment, two first bending lines L1 or one first bending line L1 and one second bending line L2 of one side of the length direction) of the end part (part more outer than the contact surface 15*a*: side part 41*b*, part to be mounted 41*c* and insertion part 41*d*) of the metal plate 41 are bent, and the resin member 43 that is held by the bent portions. Thus, a terminal component having advantages and disadvantages that are different from the conventional terminal components is provided and the technologies in the terminal component are diversified. For example, the terminal component 15 can be configured by assembling the metal plate 41 and the resin member 43, and the compatibility of light-weighting and strength improvement of the terminal component 15 can be easily achieved by the combination of metal and resin. Since the metal plate 41 holds the resin member 43, it is possible to easily enlarge an exposed area of the metal plate 41 relative to a volume of the resin member 43, compared to a terminal component in which a metal plate is surrounded by a resin member. In other words, it is possible to easily secure the contact surface 15a and to reduce size of the entire terminal component 15. The metal plate 41 can be soldered to the circuit substrate such as sub-substrate 31, so that the casing is not complicated, as a spring-type terminal, and is not enlarged, as a stroke of a spring. In addition, it is possible to easily perform gold plating at a state of the metal plate only.

The resin member 43 has the first surface 43d and the second surface 43e that is a backside of the first surface 43d. The metal plate 41 is arranged so that the backside of the contact surface 15a is contacted to the first surface 43d. The end parts of the metal plate 41 are bent to cover at least a part of the second surface 43e while extending around the sides of the first surface 43d and the outer side of the resin member 43. Thus, the bent portions of the metal plate 41 for holding the resin member 43 can be used to fix the metal plate 41 to the sub-substrate 31. In addition, the parts (parts to be mounted 41c) covering the second surface 43e are opposed to the mounting surface 31p when the contact surface 15a is made to face in the same direction as the mounting surface 31p of the sub-substrate 31, so that the parts can be soldered by reflow. In addition, since the two parts to be mounted 41c are provided with the second surface 43e being interposed therebetween, the parts to be mounted are put on the cream soldering applied on the two land pads of the substrate parts for terminal 31d. Therefore, rotational movement is less caused before the reflow, so that the operability is improved. In addition, the fixing strength after passing to a reflow furnace is also high.

Since the metal plate 41 is bent at two sides (two first bending lines L1), which are opposed to each other with the contact surface 15a being interposed therebetween, to hold the resin member 43, the positioning on the planar direction of the contact surface 15a is securely made for the resin member 43. Further, by the combination with the configuration of covering the second surface 43e, the metal plate 41 and the resin member 43 are allowed to slide along the first bending lines L1 only, so that they are securely fixed to each other.

The resin member 43 is formed with the hole 43b at the third surface 43g that intersects the bending lines (for example, first bending lines L1) of the end parts of the metal plate 41. In the meantime, the metal plate 41 has the extension part 41e that are bent so that the tip end thereof is extended in the direction following the bending lines and inserted into the hole 43b. Therefore, the positioning is securely made in the direction following the bending lines of the end parts of the metal plate 41. In addition, by the combination with the configuration of covering the second surface 43e and/or the configuration of bending the two sides that are opposed to each other with the contact surface 15a being interposed therebetween, it is possible to fix the metal plate 41 and the resin member 43 more securely.

The portable telephone 1 has the casing 4 having the openings 3f formed thereto, the sub-substrate 31 provided in the casing 3 and the terminal components 15 that are mounted on the sub-substrate 31 and exposed through the openings 3f. The terminal component 15 includes the metal plate 41 having the contact surface 15a that is at least partially exposed through the opening 3f so as to contact the contact point (power supply terminal 105) of the charging stand 101, in which at least two portions of the end parts of the metal plate 41 are bent, and the resin member 43 that is held by the bent portions. Thereby, as described above, the technologies of the terminal component are diversified. As a result, the portable telephone 1 has also the various effects. For example, since the terminal component 15 can be size-reduced, it can be arranged in a narrow space of the casing 2. Furthermore, it is possible to effectively use the space in the casing 3 and to attempt the size reduction of the casing 3. Since the terminal component 15 can be attached to a flexible circuit substrate by reflow, the circuit substrate part (substrate part for terminal 31d), on which the terminal component 15 is mounted, can be configured by a part that is extended and bent from another circuit substrate part (front substrate part 31a). As a result, it is possible to improve a degree of freedom of layouts or designs of the electronic components of the portable telephone 1.

As described above, in this embodiment, the portable telephone 1 has the battery 23 that supplies the power to the sub-substrate 31. In addition, the sub-substrate 31 has the charging circuit 91 connected to the battery 23 so that power can be supplied to the battery 23. Also, the terminal components 15 are connected to the charging circuit 91. Thereby, charging terminals (charging terminals that connection and disconnection are frequently made and relatively high voltage is applied) of the portable telephone 1 are configured by the size-reduced terminal components 15 having light-weight and improved strength. Accordingly, it is possible to improve the size reduction and durability of the portable telephone 1.

Further, in this embodiment, the power supply terminal 105 slides with respect to the contact surface 15a in a direction following the inclined surface 103c. Accordingly, in order to securely conduct the power supply terminal 105 and the contact surface 15a, it is preferable to secure an area of the contact surface 15a to some degree. As described above, since it is possible to easily secure the contact surface 15a, the terminal component 15 is suitable for the charging terminal of the portable telephone 1.

In this embodiment, the portable telephone 1 is an example of a portable electronic device of the present invention, the charging stand 101 is an example of another device of the present invention, the power supply terminal 105 of the charging stand 101 is an example of a contact point of another device of the present invention, the first bending lines L1 are an example of two sides that are opposed to each other with a contact surface of the present invention being interposed therebetween, the sub-substrate 31 or combination of the sub-substrate 31 and the main substrate 25 is an example of a circuit substrate of the present invention and the battery 23 is an example of a secondary battery of the present invention.

Second Embodiment

Figure 8:
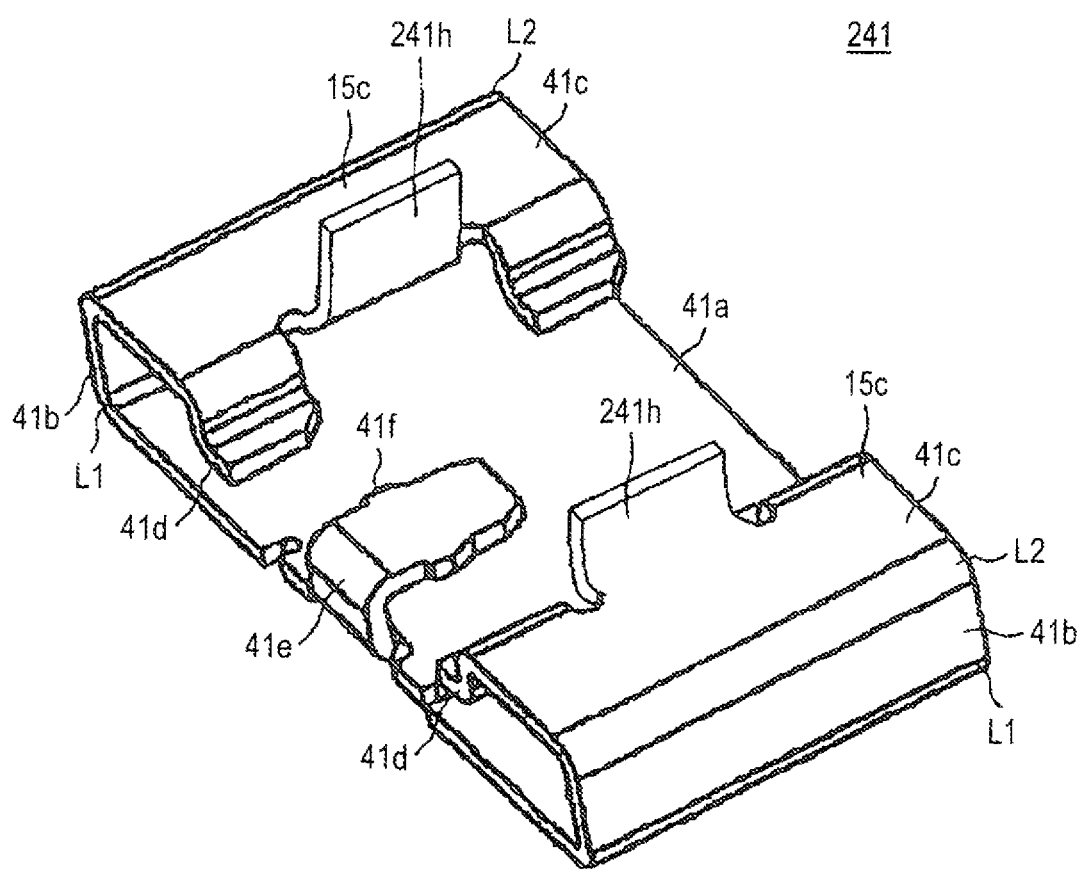
FIG. 8 is a view showing main parts of a terminal component according to a second embodiment of the present invention.

FIG. 8 is a view showing main parts of a terminal component 215 (refer to FIG. 9) according to a second embodiment of the present invention. Specifically, FIG. 8 shows a metal plate 241 that configures the terminal component 215.

Similar to the metal plate 41 of the first embodiment, the metal plate 241 configures the terminal component 215 together with the resin member 43 (refer to FIGS. 4 to 6). In the meantime, in the metal plate 241, the constitutional elements same as the metal plate 41 are indicated with the same reference numerals as the metal plate 41 and the descriptions thereof will be omitted. The metal plate 241 is different from the metal plate 41 in that it has protrusions 241h.

The protrusions 241h are configured by press processing for metal sheet of one piece, like the other parts of the metal plate 241. The protrusions 241h extend from the parts to be mounted 41c toward the inside of the casing 3 (a substrate side to be mounted). In other words, the protrusions 241h protrude from the second surface 43e of the resin member 43.

Figure 9:
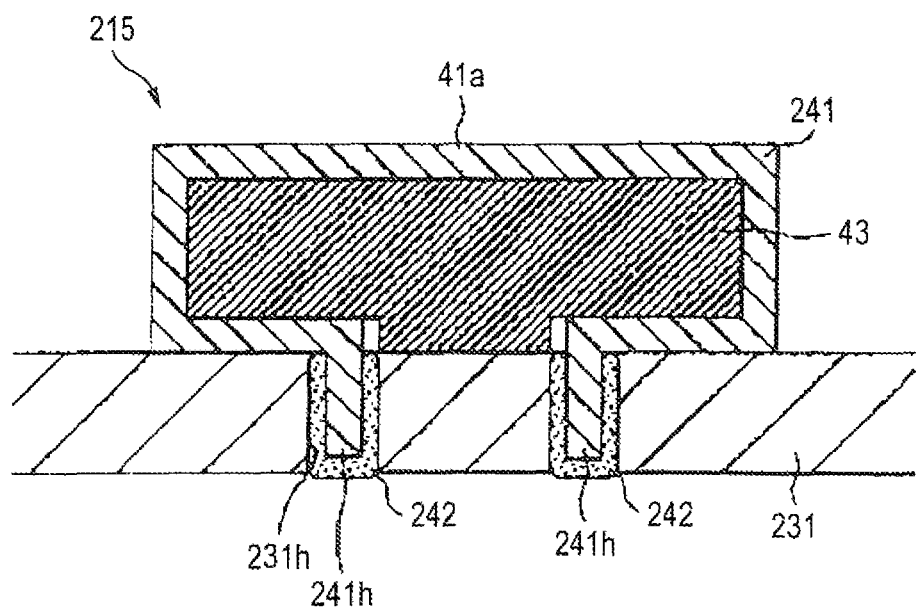
FIG. 9 is a sectional view of a terminal component having a metal plate shown in FIG. 8.

FIG. 9 is a sectional view of the terminal component 215 and a circuit substrate 231 on which the terminal component 215 is mounted.

The circuit substrate 231 is configured by a printed substrate of a rigid type, which is based on rigid resin, for example. The circuit substrate 231 is provided with mounting holes 231h. The protrusions 241h are inserted into the mounting holes 231h and the protrusions 241h and the circuit substrate 231 are fixed by soldering 242, so that the terminal component 215 is mounted on the circuit substrate 231. In other words, the terminal component 215 is mounted on the circuit substrate 231 by the dip soldering.

According to the second embodiment, the terminal component 215 include the metal plate 241 in which at least two portions of the end parts of the metal plate 214 are bent and the resin member 43 that is held by the bent portions. Thereby, the same effects as the first embodiment are achieved. In addition, when the terminal components 215 are incorporated, rather than the terminal components 15 of the portable telephone 1, a portable telephone is provided which realizes the same effects as the portable telephone 1 of the first embodiment.

The present invention is not limited to the above embodiments and can be implemented in various aspects.

The portable electronic device is not limited to the portable telephone. For example, the portable electronic device may include a digital camera, a PDA and a gaming device. The casing is not limited to the straight type. For example, the caging may include a casing in which two or more casings are connected to relatively move, such as fold type, horizontal type and sliding type.

The terminal component is not limited to the charging terminal. For example, the terminal component may include a terminal for transmitting and/or receiving an electric signal, which includes various information such as sound information, image information and a detection result of a sensor, between a portable electronic device and another device. In addition, another device is not limited to the charging stand. For example, another device may include another portable electronic device having the same configuration as the portable electronic device.

The metal plate is not limited to the configuration in which two or more portions are bent to hold the resin member. For example, the metal plate may include a metal plate in which one portion is bent to hold the resin member, such as V-shaped bending. In addition, the metal plate may include a metal plate that is C-shaped curved to hold the resin member, namely, is not bent. When a metal plate has opposite parts with resin being interposed therebetween, it can hold the resin.

The shape of the metal plate in which two or more portions are bent is not limited to the embodiments. For example, the contact surface (contact surface part) is not limited to the rectangular shape and may be triangular or elliptical. The bent portions may be two portions with the contact surface being interposed therebetween (for example, two bending lines L1 in the embodiments) or two portions of one side of the contact surface (for example, one first bending line L1 and one second bending line L2 of one side in the length direction of the terminal component 15 in the embodiments). When the contact surface has a length direction and a width direction, the bending may be made in both directions. The bending may be made on every side of the contact surface.

When the end parts of the metal plate (in the embodiments, a part opposite to the contact surface 15a regarding the first bending lines L1) are bent to cover at least a part of the second surface 43 and to protrude from the second surface while extending around the sides of the first surface and the outer side of the resin member, the protrusions protruding from the second surface (protrusions 241h in the embodiment) may not be formed by the tip end of the parts (parts to be mounted 41c) covering the second surface 43e. In other words, in the embodiment, the protrusions may protrude from the second surface 43e in the second bending lines L2. Inversely, the protrusions may be configured by the entire tip ends of the parts covering the second surface. In other words, in the embodiments, the insertion parts 41d may be changed into the protrusions.

The terminal component is not limited to the configuration of the assembly of the metal plate and the resin member. For example, the terminal component may be configured by insert molding in which melted resin is filled in a mold with a metal plate being placed in the mold.

This application claims the priority of Japanese Patent Application No. 2008-141044 filed on May 29, 2008, the disclosures of which are incorporated herein by reference.

DESCRIPTIONS OF REFERENCE NUMERALS

15: terminal component, 15a: contact surface, 41: metal plate, 43: resin member, 101: charging stand (another device), 105: power supply terminal (contact point)

The invention claimed is:

1. A terminal component comprising:
a metal plate including a contact surface to contact a contact point of another device, wherein at least two portions of an end part of the metal plate are bent; and
a resin member that is held by the bent portions,
wherein a part to be mounted on a circuit substrate is formed at the bent portions of the metal plate,
wherein the resin member includes a first surface and a second surface that is a backside of the first surface,
wherein the second surface is formed with a groove portion,
wherein the metal plate is arranged so that a backside of the contact surface is contacted to the first surface, and
wherein the end part of the metal plate is bent so that that the end part covers at least a part of the second surface while extending around an outer side of the resin member via a side of the first surface and a tip end of the end part is inserted into the groove portion from the second surface.

2. The terminal component according to claim 1,
wherein a part of the end part protrudes from the second surface.

3. The terminal component according to claim 1,
wherein the metal plate is bent at two sides that are opposed to each other with the contact surface being interposed therebetween to hold the resin member.

4. A terminal component comprising:
a metal plate including a contact surface to contact a contact point of another device, wherein at least two portions of an end part of the metal plate are bent; and
a resin member that is held by the bent portions,
wherein a part to be mounted on a circuit substrate is formed at the bent portions of the metal plate,
wherein the resin member includes a first surface and a second surface that is a backside of the first surface,
wherein the metal plate is arranged so that a backside of the contact surface is contacted to the first surface, and
wherein the end part of the metal plate is bent to cover at least a part of the second surface while extending around an outer side of the resin member via a side of the first surface,
wherein the resin member has a hole that is formed on a surface which intersects a bending line of the end part of the metal plate, and
wherein the metal plate further includes an extension part at a part other than the two portions of the end part, the extension part being bent so that a tip end thereof is extended toward a direction extending along the bending line and inserted into the hole.

5. The terminal component according to claim 4, wherein a part of the end part protrudes from the second surface.

6. The terminal component according to claim 4, wherein the metal plate is bent at two sides that are opposed to each other with the contact surface being interposed therebetween to hold the resin member.

7. A portable electronic device comprising:
a casing formed with an opening;
a circuit substrate that is provided in the casing; and
a terminal component that is mounted on the circuit substrate and is exposed through the opening,
wherein the terminal component includes:
    a metal plate including a contact surface that is at least partially exposed through the opening to contact a contact point of another device, wherein at least two portions of an end part of the metal plate are bent; and
    a resin member that is held by the bent portions, and
wherein the terminal component is soldered to the circuit substrate at the bent portions of the metal plate,
wherein the resin member includes a first surface and a second surface that is formed on a backside of the first surface,
wherein the second surface is formed with a groove portion,
wherein the metal plate is arranged so that a backside of the contact surface is contacted to the first surface, and
wherein the end part of the metal plate is bent so that the end part covers at least a part of the second surface while extending around an outer side of the resin member via a side of the first surface and a tip end of the end part is inserted into the groove portion from the second surface.

8. The portable electronic device according to claim 7, further comprising:
a secondary battery that supplies power to the circuit substrate,
wherein the circuit substrate includes a charging circuit that is connected to the secondary battery so that power can be supplied to the secondary battery, and
wherein the terminal component is connected to the charging circuit.

9. The portable electronic device according to claim 7, wherein a part covering the second surface is soldered to the circuit substrate.

10. A portable electronic device comprising:
a casing formed with an opening;
a circuit substrate that is provided in the casing; and
a terminal component that is mounted on the circuit substrate and is exposed through the opening,
wherein the terminal component includes:
    a metal plate including a contact surface that is at least partially exposed through the opening to contact a contact point of another device, wherein at least two portions of an end part of the metal plate are bent; and
    a resin member that is held by the bent portions, and
wherein the terminal component is soldered to the circuit substrate at the bent portions of the metal plate,
wherein the resin member includes a first surface and a second surface that is formed on a backside of the first surface,
wherein the metal plate is arranged so that a backside of the contact surface is contacted to the first surface,
wherein the end part of the metal plate is bent so that the end part covers at least a part of the second surface while extending an outer side of the resin member via a side of the first surface and a part of the end part protrudes from the second surface and is inserted and soldered in a mounting hole provided in the circuit substrate.

11. The portable electronic device according to claim 8, further comprising:
a secondary battery that supplies power to the circuit substrate,
wherein the circuit substrate includes a charging circuit that is connected to the secondary battery so that power can be supplied to the secondary battery, and
wherein the terminal component is connected to the charging circuit.

12. The portable electronic device according to claim 10, wherein a part covering the second surface is soldered to the circuit substrate.

* * * * *